United States Patent
Downton

(10) Patent No.: US 7,168,507 B2
(45) Date of Patent: Jan. 30, 2007

(54) RECALIBRATION OF DOWNHOLE SENSORS

(75) Inventor: Geoff Downton, Minchinhampton (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 307 days.

(21) Appl. No.: 10/249,200

(22) Filed: Mar. 21, 2003

(65) Prior Publication Data

US 2003/0209365 A1    Nov. 13, 2003

Related U.S. Application Data

(60) Provisional application No. 60/319,241, filed on May 13, 2002.

(51) Int. Cl.
*G01S 17/00* (2006.01)

(52) U.S. Cl. .................... 175/50; 73/1.75; 73/1.01

(58) Field of Classification Search ........... 73/152.46, 73/152.54, 152.01, 152.43, 1.01, 1.75, 152.14; 250/251.1, 252.1; 166/250.1; 175/40, 41, 175/50

See application file for complete search history.

(56) References Cited

U.S. PATENT DOCUMENTS

| | | | |
|---|---|---|---|
| 712,887 A | 11/1902 | Wyczynski | 175/230 |
| 1,971,480 A | 8/1934 | Earley | 175/61 |
| 2,319,236 A | 5/1943 | Isaacks | 175/73 |
| 2,345,766 A | 4/1944 | Miller | 175/73 |
| 2,585,207 A | 2/1952 | Zublin | 175/75 |
| 2,687,282 A | 8/1954 | Sanders | 175/263 |
| 2,694,549 A | 11/1954 | James | 175/82 |
| 2,712,434 A | 7/1955 | Giles et al. | 175/73 |
| 2,857,141 A | 10/1958 | Carpenter | 175/270 |
| 2,876,992 A | 3/1959 | Lindsay | 175/73 |
| 3,051,255 A | 8/1962 | Deely | 175/265 |
| 3,062,303 A | 11/1962 | Schultz | 175/61 |
| 3,068,946 A | 12/1962 | Frisby et al. | 175/73 |
| 3,092,188 A | 6/1963 | Farris | 175/76 |
| 3,098,534 A | 7/1963 | Carr et al. | 175/73 |
| 3,104,726 A | 9/1963 | Davis | 175/331 |
| 3,123,162 A | 3/1964 | Rowley | 175/325.5 |
| 3,129,776 A | 4/1964 | Mann | 175/76 |
| 3,225,843 A | 12/1965 | Ortloff et al. | 175/93 |
| 3,305,771 A | 2/1967 | Arps | 324/342 |
| 3,309,656 A | 3/1967 | Godbey | 367/85 |
| 3,370,657 A | 2/1968 | Antle | 175/74 |
| 3,457,999 A | 7/1969 | Massey | 175/61 |

(Continued)

FOREIGN PATENT DOCUMENTS

EP    0 343 800 A2    11/1989

(Continued)

*Primary Examiner*—Hezron Williams
*Assistant Examiner*—Tamiko Bellamy
(74) *Attorney, Agent, or Firm*—Matthias Abrell; Brigitte L. Echols; Dale V. Gaudier

(57) ABSTRACT

In downhole drilling tools, a first set of inexpensive and/or relatively small sensors that typically have lower accuracy and higher drift than conventional downhole sensors are located in the drill string adjacent to the bit. A second set of highly accurate sensors is located in a more protected location higher in the drill string away from the drill bit. As drilling progresses these sensors pass through the same portion of the formation measured by the first set of sensors. Key properties are measured by the second set of sensors which allow a calibration offset to be applied the data measured by the first set of sensors.

38 Claims, 3 Drawing Sheets

U.S. PATENT DOCUMENTS

| | | | | |
|---|---|---|---|---|
| 3,512,592 | A | 5/1970 | Kellner | 175/5 |
| 3,561,549 | A | 2/1971 | Garrison et al. | 175/76 |
| 3,575,247 | A | 4/1971 | Feenstra | 175/434 |
| 3,637,032 | A | 1/1972 | Jeter | 175/73 |
| 3,667,556 | A | 6/1972 | Henderson | 175/73 |
| 3,743,034 | A | 7/1973 | Bradley | 175/61 |
| 3,799,279 | A | 3/1974 | Farris | 175/325.3 |
| 3,878,903 | A | 4/1975 | Cherrington | 175/45 |
| 3,888,319 | A | 6/1975 | Bourne, Jr. et al. | 175/176 |
| 3,903,974 | A | 9/1975 | Cullen | 175/17 |
| 3,974,886 | A | 8/1976 | Blake, Jr. | 175/76 |
| 3,997,008 | A | 12/1976 | Kellner | 175/45 |
| 4,022,287 | A | 5/1977 | Lundstrom et al. | 175/393 |
| 4,027,301 | A | 5/1977 | Mayer | 340/870.13 |
| 4,040,494 | A | 8/1977 | Kellner | 175/45 |
| 4,040,495 | A | 8/1977 | Kellner et al. | 175/73 |
| 4,076,084 | A | 2/1978 | Tighe | 175/73 |
| 4,080,115 | A | 3/1978 | Sims et al. | 418/48 |
| 4,152,545 | A | 5/1979 | Gilbreath, Jr. et al. | 380/259 |
| 4,184,553 | A | 1/1980 | Jones, Jr. et al. | 175/61 |
| 4,185,704 | A | 1/1980 | Nixon, Jr. | 175/76 |
| 4,190,123 | A | 2/1980 | Roddy | 175/325.3 |
| 4,211,292 | A | 7/1980 | Evans | 175/61 |
| 4,220,213 | A | 9/1980 | Hamilton | 175/45 |
| 4,241,796 | A | 12/1980 | Green et al. | 175/24 |
| 4,270,619 | A | 6/1981 | Base | 175/61 |
| 4,291,773 | A | 9/1981 | Evans | 175/61 |
| 4,305,474 | A | 12/1981 | Farris et al. | 175/73 |
| 4,351,037 | A | 9/1982 | Scherbatskoy | 367/85 |
| 4,357,634 | A | 11/1982 | Chung | 360/40 |
| 4,388,974 | A | 6/1983 | Jones, Jr. et al. | 175/325.2 |
| 4,394,881 | A | 7/1983 | Shirley | 175/76 |
| 4,407,377 | A | 10/1983 | Russell | 175/325.2 |
| 4,416,339 | A | 11/1983 | Baker et al. | 175/61 |
| 4,428,441 | A | 1/1984 | Dellinger | 175/61 |
| 4,449,595 | A | 5/1984 | Holbert | 175/79 |
| 4,456,080 | A | 6/1984 | Holbert | 175/61 |
| 4,461,359 | A | 7/1984 | Jones, Jr. et al. | 175/61 |
| 4,465,147 | A | 8/1984 | Feenstra | 175/73 |
| 4,491,187 | A | 1/1985 | Russell | 175/325.2 |
| 4,492,276 | A | 1/1985 | Kamp | 175/61 |
| 4,515,225 | A | 5/1985 | Dailey | 175/40 |
| 4,523,652 | A | 6/1985 | Schuh | 175/61 |
| 4,560,013 | A | 12/1985 | Beimgraben | 175/73 |
| 4,572,305 | A | 2/1986 | Swietlik | 175/325.4 |
| 4,577,701 | A | 3/1986 | Dellinger et al. | 175/61 |
| 4,635,736 | A | 1/1987 | Shirley | 175/76 |
| 4,637,479 | A | 1/1987 | Leising | 175/26 |
| 4,638,873 | A | 1/1987 | Welborn | 175/73 |
| 4,655,289 | A | 4/1987 | Schoeffler | 166/320 |
| 4,662,458 | A | 5/1987 | Ho | 175/27 |
| 4,667,751 | A | 5/1987 | Geczy et al. | 175/61 |
| 4,683,956 | A | 8/1987 | Russell | 166/383 |
| 4,690,229 | A | 9/1987 | Raney | 175/325.4 |
| 4,697,651 | A | 10/1987 | Dellinger | 175/61 |
| 4,699,224 | A | 10/1987 | Burton | 175/61 |
| 4,714,118 | A | 12/1987 | Baker et al. | 175/26 |
| 4,732,223 | A | 3/1988 | Schoeffler et al. | 175/73 |
| 4,739,843 | A | 4/1988 | Burton | 175/73 |
| 4,763,258 | A | 8/1988 | Engelder | 340/853.3 |
| 4,787,093 | A | 11/1988 | Rorden | 375/239 |
| 4,807,708 | A | 2/1989 | Forrest et al. | 175/45 |
| 4,811,798 | A | 3/1989 | Falgout, Sr. et al. | 175/73 |
| 4,821,815 | A | 4/1989 | Baker et al. | 175/26 |
| 4,821,817 | A | 4/1989 | Cendre et al. | 175/269 |
| 4,836,301 | A | 6/1989 | Van Dongen et al. | 175/61 |
| 4,842,083 | A | 6/1989 | Raney | 175/325.4 |
| 4,844,178 | A | 7/1989 | Cendre et al. | 175/73 |
| 4,848,488 | A | 7/1989 | Cendre et al. | 175/61 |
| 4,848,490 | A | 7/1989 | Anderson | 175/323 |
| 4,854,397 | A | 8/1989 | Warren et al. | 175/26 |
| 4,854,403 | A | 8/1989 | Ostertag et al. | 175/325.4 |
| 4,858,705 | A | 8/1989 | Thiery | 175/73 |
| 4,867,255 | A | 9/1989 | Baker et al. | 175/61 |
| 4,880,067 | A | 11/1989 | Jelsma | 175/107 |
| 4,886,130 | A | 12/1989 | Evans | 175/73 |
| 4,895,214 | A | 1/1990 | Schoeffler | 175/38 |
| 4,901,804 | A | 2/1990 | Thometz et al. | 175/40 |
| 4,905,774 | A | 3/1990 | Wittrisch | 340/853.4 |
| 4,908,804 | A | 3/1990 | Rorden | 367/81 |
| 4,938,298 | A | 7/1990 | Rehm | 175/61 |
| 4,947,944 | A | 8/1990 | Coltman et al. | 175/73 |
| 4,948,925 | A | 8/1990 | Winters et al. | 175/48 |
| 4,951,760 | A | 8/1990 | Cendre et al. | 175/269 |
| 4,995,465 | A | 2/1991 | Beck et al. | 175/27 |
| 5,000,272 | A | 3/1991 | Wiebe et al. | 175/73 |
| 5,038,872 | A | 8/1991 | Shirley | 175/76 |
| 5,050,692 | A | 9/1991 | Beimgraben | 175/61 |
| 5,052,501 | A | 10/1991 | Wenzel et al. | 175/74 |
| RE33,751 | E | 11/1991 | Geczy et al. | 175/61 |
| 5,065,825 | A | 11/1991 | Bardin et al. | 175/38 |
| 5,070,950 | A | 12/1991 | Cendre et al. | 175/74 |
| 5,099,934 | A | 3/1992 | Barr | 175/393 |
| 5,103,919 | A | 4/1992 | Warren et al. | 175/45 |
| 5,109,935 | A | 5/1992 | Hawke | 175/434 |
| 5,113,953 | A | 5/1992 | Noble | 175/61 |
| 5,117,927 | A | 6/1992 | Askew | 175/61 |
| 5,131,479 | A | 7/1992 | Boulet et al. | 175/73 |
| 5,139,094 | A | 8/1992 | Prevedel et al. | 175/61 |
| 5,160,925 | A | 11/1992 | Dailey et al. | 340/853.3 |
| 5,163,521 | A | 11/1992 | Pustanyk et al. | 175/40 |
| 5,181,576 | A | 1/1993 | Askew et al. | 175/61 |
| 5,186,264 | A | 2/1993 | du Chaffaut | 175/27 |
| 5,213,168 | A | 5/1993 | Warren et al. | 175/61 |
| 5,220,963 | A | 6/1993 | Patton | 175/34 |
| 5,224,558 | A | 7/1993 | Lee | 175/325.4 |
| 5,265,682 | A | 11/1993 | Russell et al. | 175/45 |
| 5,265,687 | A | 11/1993 | Gray | 175/45 |
| 5,305,830 | A | 4/1994 | Wittrisch | 166/250.01 |
| 5,305,838 | A | 4/1994 | Pauc | 175/73 |
| 5,311,952 | A | 5/1994 | Eddison et al. | 175/61 |
| 5,311,953 | A | 5/1994 | Walker | 175/61 |
| 5,316,093 | A | 5/1994 | Morin et al. | 175/74 |
| 5,325,714 | A | 7/1994 | Lende et al. | 175/152.03 |
| 5,332,048 | A | 7/1994 | Underwood et al. | 175/26 |
| 5,341,886 | A | 8/1994 | Patton | 175/24 |
| 5,343,966 | A | 9/1994 | Wenzel et al. | 175/74 |
| 5,375,098 | A | 12/1994 | Malone et al. | 367/83 |
| 5,390,748 | A | 2/1995 | Goldman | 175/24 |
| 5,410,303 | A | 4/1995 | Comeau et al. | 340/853.3 |
| 5,421,420 | A | 6/1995 | Malone et al. | 175/61 |
| 5,467,834 | A | 11/1995 | Hughes et al. | 175/61 |
| 5,484,029 | A | 1/1996 | Eddison | 175/73 |
| 5,507,353 | A | 4/1996 | Pavone | 175/27 |
| 5,520,255 | A | 5/1996 | Barr et al. | 175/24 |
| 5,520,256 | A | 5/1996 | Eddison | 175/61 |
| 5,529,133 | A | 6/1996 | Eddison | 175/61 |
| 5,553,678 | A | 9/1996 | Barr et al. | 175/73 |
| 5,553,679 | A | 9/1996 | Thorp | 175/73 |
| 5,582,259 | A | 12/1996 | Barr | 175/73 |
| 5,594,343 | A | 1/1997 | Clark et al. | 324/338 |
| 5,602,541 | A | 2/1997 | Comeau et al. | 340/853.3 |
| 5,603,385 | A | 2/1997 | Colebrook | 175/45 |
| 5,617,926 | A | 4/1997 | Eddison et al. | 175/63 |
| 5,673,763 | A | 10/1997 | Thorp | 175/73 |
| 5,685,379 | A | 11/1997 | Barr et al. | 175/61 |
| 5,695,015 | A | 12/1997 | Barr et al. | 175/61 |
| 5,706,905 | A | 1/1998 | Barr | 175/61 |
| 5,738,178 | A | 4/1998 | Williams et al. | 175/61 |
| 5,778,992 | A | 7/1998 | Fuller | 175/73 |
| 5,803,185 | A | 9/1998 | Barr et al. | 175/45 |
| 5,812,068 | A | 9/1998 | Wisler et al. | 340/855.5 |
| 5,842,149 | A | 11/1998 | Harrell et al. | 702/19 |
| 5,875,859 | A | 3/1999 | Ikeda et al. | 175/73 |

| | | | |
|---|---|---|---|
| 5,959,380 A | 9/1999 | Gillett et al. ............... 310/561 |
| 5,971,085 A | 10/1999 | Colebrook ................. 175/266 |
| 6,082,470 A | 7/2000 | Webb et al. .................. 175/45 |
| 6,089,332 A | 7/2000 | Barr et al. .................... 175/45 |
| 6,092,610 A | 7/2000 | Kosmala et al. .............. 175/61 |
| 6,109,372 A | 8/2000 | Dorel et al. ................. 175/61 |
| 6,116,354 A | 9/2000 | Buytaert ...................... 175/55 |
| 6,607,044 B1 * | 8/2003 | Eppink et al. ................ 175/61 |

FOREIGN PATENT DOCUMENTS

| | | |
|---|---|---|
| EP | 0 594 418 A1 | 4/1994 |
| EP | 0 685 623 A2 | 12/1995 |
| EP | 0 459 008 BA | 5/1996 |
| EP | 0 520 733 B1 | 6/1996 |
| EP | 0 744 526 A1 | 11/1996 |
| EP | 0 762 606 A2 | 3/1997 |
| EP | 0 530 045 B1 | 4/1997 |
| EP | 0 770 760 A1 | 5/1997 |
| EP | 0 841 462 A2 | 5/1998 |
| EP | 0 874 128 A2 | 10/1998 |
| EP | 0 677 640 B1 | 9/1999 |
| EP | 0 685 626 B1 | 8/2000 |
| EP | 0 728 907 B1 | 8/2000 |
| EP | 0 728 908 B1 | 8/2000 |
| EP | 0 728 909 B1 | 8/2000 |
| EP | 0 728 910 B1 | 8/2000 |
| GB | 2 154 485 A | 9/1985 |
| GB | 2 172 324 A | 9/1986 |
| GB | 2 172 325 A | 9/1986 |
| GB | 2 177 738 A | 1/1987 |
| GB | 2 183 272 A | 6/1987 |
| GB | 2 183 694 A | 6/1987 |
| GB | 2 246 151 A | 1/1992 |
| GB | 2 257 182 A | 1/1993 |
| GB | 2 259 316 A | 3/1993 |
| GB | 2285651 | 7/1995 |
| GB | 2 289 907 A | 12/1995 |
| GB | 2 289 908 A | 12/1995 |
| GB | 2 289 909 A | 12/1995 |
| GB | 2 290 097 A | 12/1995 |
| GB | 2 290 356 A | 12/1995 |
| GB | 2 298 215 A | 8/1996 |
| GB | 2 298 216 A | 8/1996 |
| GB | 2 298 217 A | 8/1996 |
| GB | 2 298 218 A | 8/1996 |
| GB | 2 301 386 A | 12/1996 |
| GB | 2 304 756 A | 3/1997 |
| GB | 2 306 529 A | 7/1997 |
| GB | 2 312 905 A | 11/1997 |
| GB | 2 322 651 A | 9/1998 |
| GB | 2 325 016 A | 11/1998 |
| GB | 2 328 466 A | 2/1999 |
| GB | 2 335 450 A | 9/1999 |
| GB | 2 336 171 A | 10/1999 |
| GB | 2 339 222 A | 1/2000 |
| GB | 2 339 223 A | 1/2000 |
| GB | 2 340 153 A | 2/2000 |
| GB | 2 342 935 A | 4/2000 |
| GB | 2 343 470 A | 5/2000 |
| GB | 2 344 607 A | 6/2000 |
| GB | 2 347 951 A | 9/2000 |
| WO | WO 96/31679 A1 | 10/1996 |
| WO | WO 01/34935 A1 | 5/2001 |

* cited by examiner

RECALIBRATION OF DOWNHOLE SENSORS

CROSS REFERENCE TO RELATED APPLICATIONS

This application claims priority from U.S. Provisional Patent Application No. 60/319,241 filed May 13, 2002, incorporated by reference herein for all it contains.

BACKGROUND OF THE INVENTION

1. Field of the Invention

The present invention relates to sensing formation properties and other conditions while drilling boreholes into the earth. Specifically, the invention provides for measuring these properties in the very severe environment adjacent to the drill bit using sensors that are inexpensive but have calibration drift. These sensors are re-calibrated by a second set of sensors with high-accuracy located in a less severe environment.

2. Description of the Related Art

The present invention applies to the calibration of sensors within a rotary drilling system using measurements generated by a remote measuring while drilling (MWD) tool. Previously, sensors were located far from the drill bit due to packaging size constraints and to minimize damage and calibration drift caused by the severe accelerations and hostile environment adjacent to the drill bit. This places the sensors a considerable distance from the most desirable location to acquire data, the region immediately adjacent to the bit. The presence of the drilling fluid and the pressure difference between the drilling fluid and the fluids in the formation often compromise the readings of these remotely located sensors. Also, many properties which are valuable when measured near the drill bit, including inclination, azimuth, vibration, rotational position, temperature, etc., cannot be accurately measured remotely. The expense, fragility, and physical size of accurate sensors make it at best impractical, and often impossible for them to be packaged into a small location close to (or within) the drill bit. The less expensive and/or smaller sensors that may be used in the drill string adjacent to the drill bit do not have the desired adequate long-term stability and accuracy.

SUMMARY OF THE INVENTION

The present invention locates a first set of inexpensive and/or relatively small sensors that typically have lower accuracy and higher drift than conventional downhole sensors in the drill string adjacent to the bit. A second set of highly accurate sensors is located in a more protected location higher in the drill string away from the drill bit. As drilling progresses these second sensors pass through the same portion of the formation measured by the first set of sensors. Key properties are measured by the second set of sensors which allow a calibration offset to be applied to the data measured by the first set of sensors.

For example, a sensor prone to mechanical shock induced drift could be located among the first set of sensors. A second, similar sensor located remotely from the drill bit with the second set of sensors in an area with less mechanical shock would then be able to measure the same property a short time later, and provide a continuous offset value to adjust the first measurement.

Accordingly, disclosed herein is a method for sensing a condition in a borehole while drilling with a drill string, by providing a sensor in the drill string adjacent to a drill bit for measuring the borehole condition, providing a second sensor in the drill string remote from the first sensor for measuring the borehole condition, measuring the borehole condition with the first sensor at a first location of the borehole, drilling until the second sensor reaches the first location of the borehole, measuring the borehole condition with the second sensor at the first location within the borehole, and re-calibrating the first sensor using the measurement made by the second sensor at the first location within the borehole.

A device for sensor re-calibration is also disclosed for a bottom hole assembly of a drill string for drilling a borehole. The device has a first sensor in the drill string adjacent to a drill bit for measuring a condition of the borehole at a location in the borehole, and a second sensor in the drill string, remote from the first sensor, for measuring the same borehole condition. There is also a device to store the measurement made by the first sensor and compare it to the measurement made by the second sensor. The device provides a re-calibration offset for the first sensor based upon the comparison.

The same types of reading are not necessarily required. For example, if the one of the first set of sensors has a known temperature induced deviation in its readings, an accurate temperature sensor located with the second set of sensors could provide the necessary information to apply the proper offset.

Accordingly, also disclosed is a method for sensing a first condition in a borehole while drilling with a drill string, by providing a sensor in the drill string adjacent to a drill bit for measuring the first borehole condition, providing a second sensor in the drill string remote from the first sensor for measuring a second borehole condition, measuring the first borehole condition with the first sensor at a first location of the borehole, drilling until the second sensor reaches the first location of the borehole, measuring the second borehole condition with the second sensor at the first location within the borehole, and, re-calibrating the first sensor using the measurement made by the second sensor at the first location within the borehole.

A related device is disclosed as a bottom hole assembly of a drill string for drilling a borehole. The assembly has a first sensor in the drill string adjacent to a drill bit for measuring a first condition of the borehole at a location in the borehole, and a second sensor in the drill string remote from the first sensor for measuring a second borehole condition. There is also a device to store the measurement made by the first sensor and compare it to the measurement made by the second sensor which provides a re-calibration offset for the first sensor based upon the comparison.

Advantages of this invention include: using lower cost sensors within the rotary drilling system without sacrificing drilling performance; detecting and correcting sensor degradation/failures while drilling; and enacting reversionary schemes to compensate for the loss of a sensor and thereby avoid preventable drilling errors.

DETAILED DESCRIPTION

Figure 1:
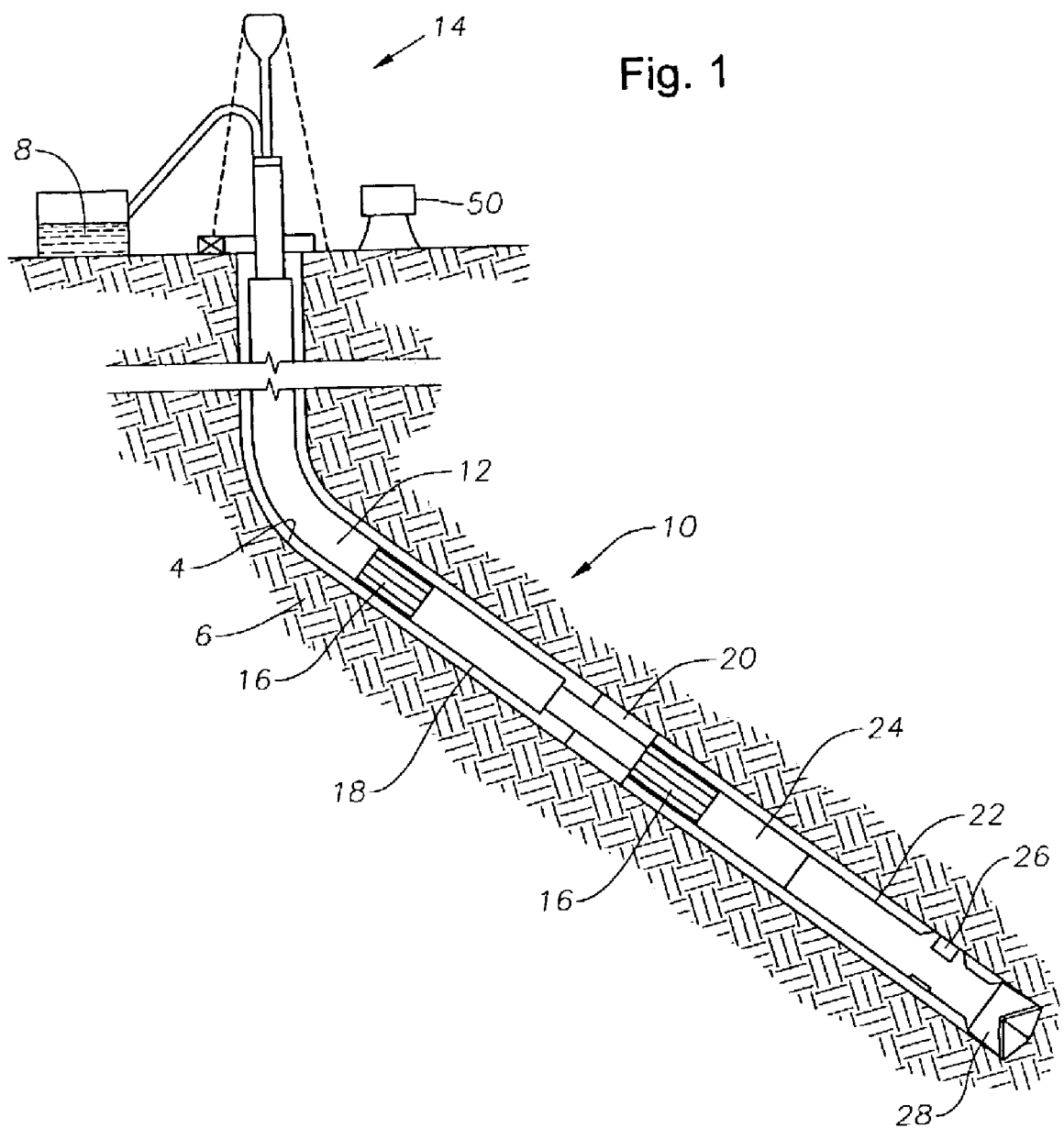
FIG. 1 is a plan view of a drill string drilling into an earthen formation showing the arrangements of the components of the present invention.
Figure 2:
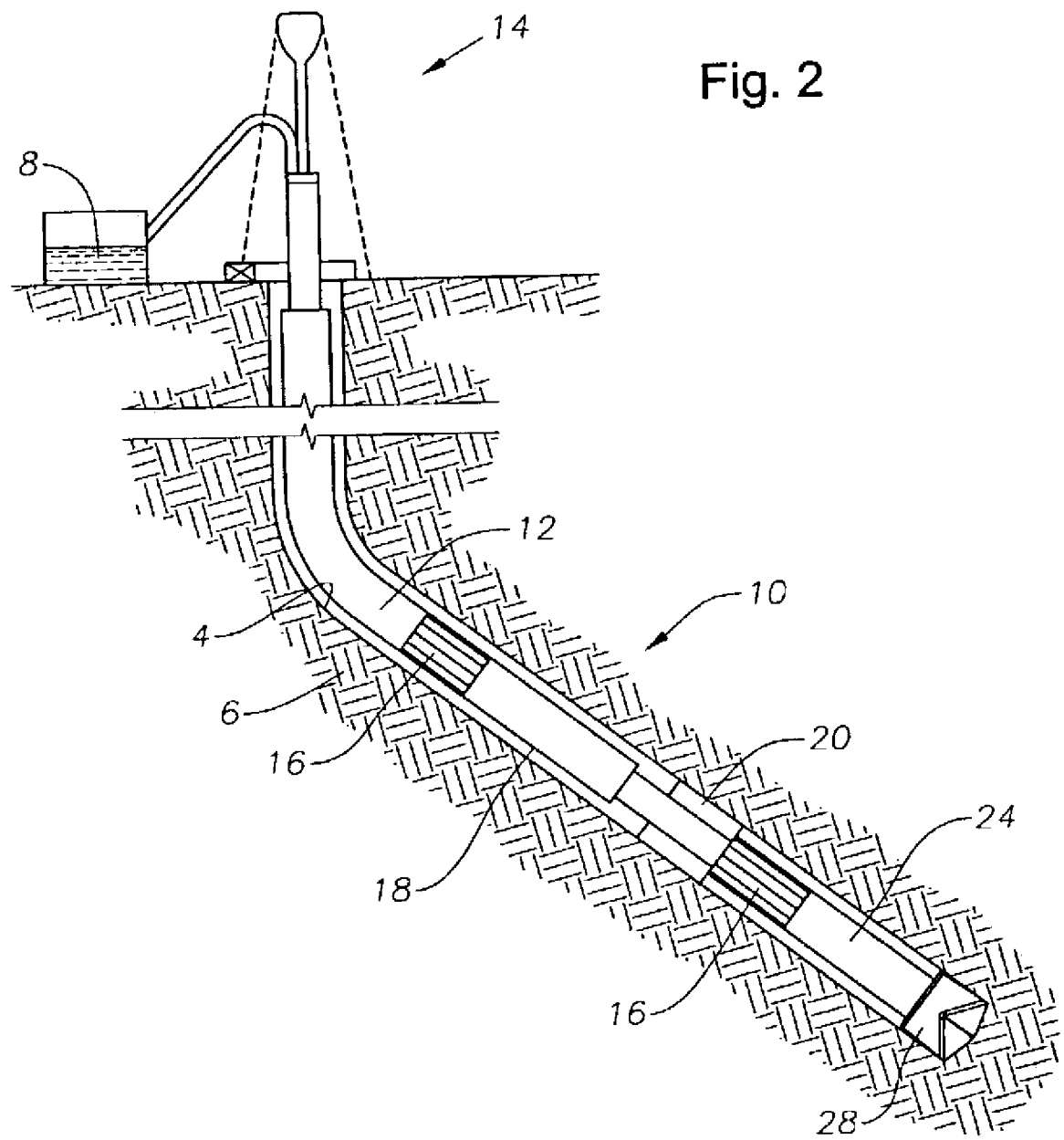
FIG. 2 is a plan view of a drill string drilling into an earthen formation showing an alternate arrangement of the components of the present invention.

Referring now to FIGS. 1 and 2, when drilling boreholes 4 into earthen formations 6, it is common practice to use a bottom hole assembly as shown in FIG. 1. The bottom hole assembly (BHA), generally indicated as 10, is typically connected to the end of the tubular drill string 12, which is typically rotatably driven by a drilling rig 14 from the surface. In addition to providing motive force for rotating the drill string 12, the drilling rig 14 also supplies a drilling fluid 8 under pressure through the tubular drill string 12 to the bottom hole assembly 10. The drilling fluid 8 is typically laden with abrasive material, as it is repeatedly re-circulated through the borehole 4. In order to achieve appropriate control while drilling, components of the bottom hole assembly 10 may include one or more drill collars 16, a measuring while drilling (MWD) module 18, stabilizers 20, an electronics section 24, a drill bit 28 and optionally a rotary steerable system 22. The rotary steerable system 22 typically includes a steering section 26 coupled to the electronics section 24. The drill bit 28 is either attached to the steering section 26 if the rotary steerable system 22 is being used, as shown in FIG. 1, or it is attached directly to the electronics section 24 as shown in FIG. 2.

For systems utilizing the rotary steerable system 22 as shown in FIG. 1, a surface control system (not shown) may be utilized to communicate steering commands to the electronics section 24 either directly or via the measuring while drilling module 18 included among the drill collars 16.

The actual arrangements of the components of the BHA 10 vary considerably depending upon the drilling conditions. Therefore, the arrangement shown in FIG. 1 is for illustration purposes only, and is not intended to limit the present invention in any manner.

Figure 3A:
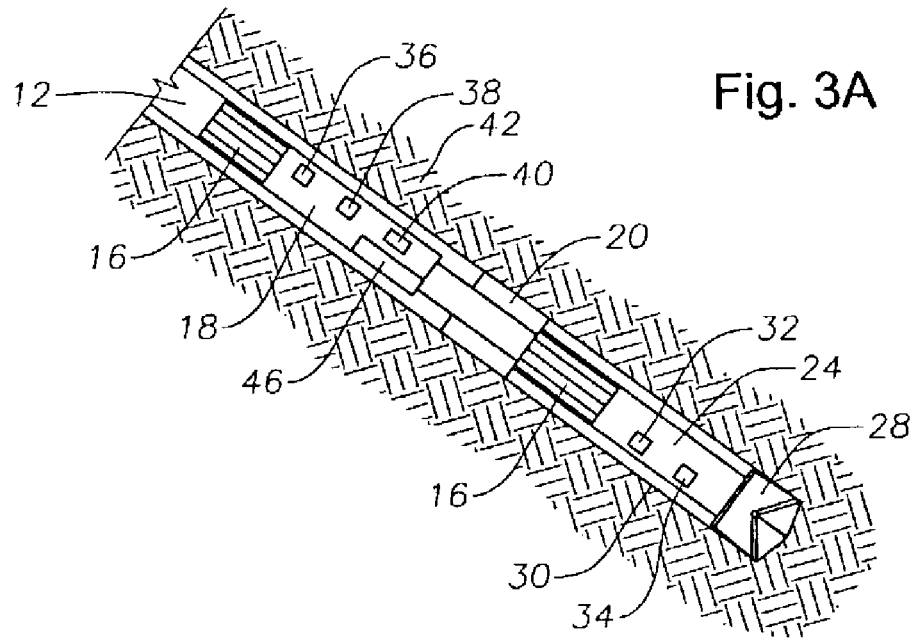
FIG. 3A is an enlarged view of a portion of the drill string of FIG. 2 showing the lower end of the bottom hole assembly with a sensor arrangement of the present invention in a first drilling location.
Figure 3B:
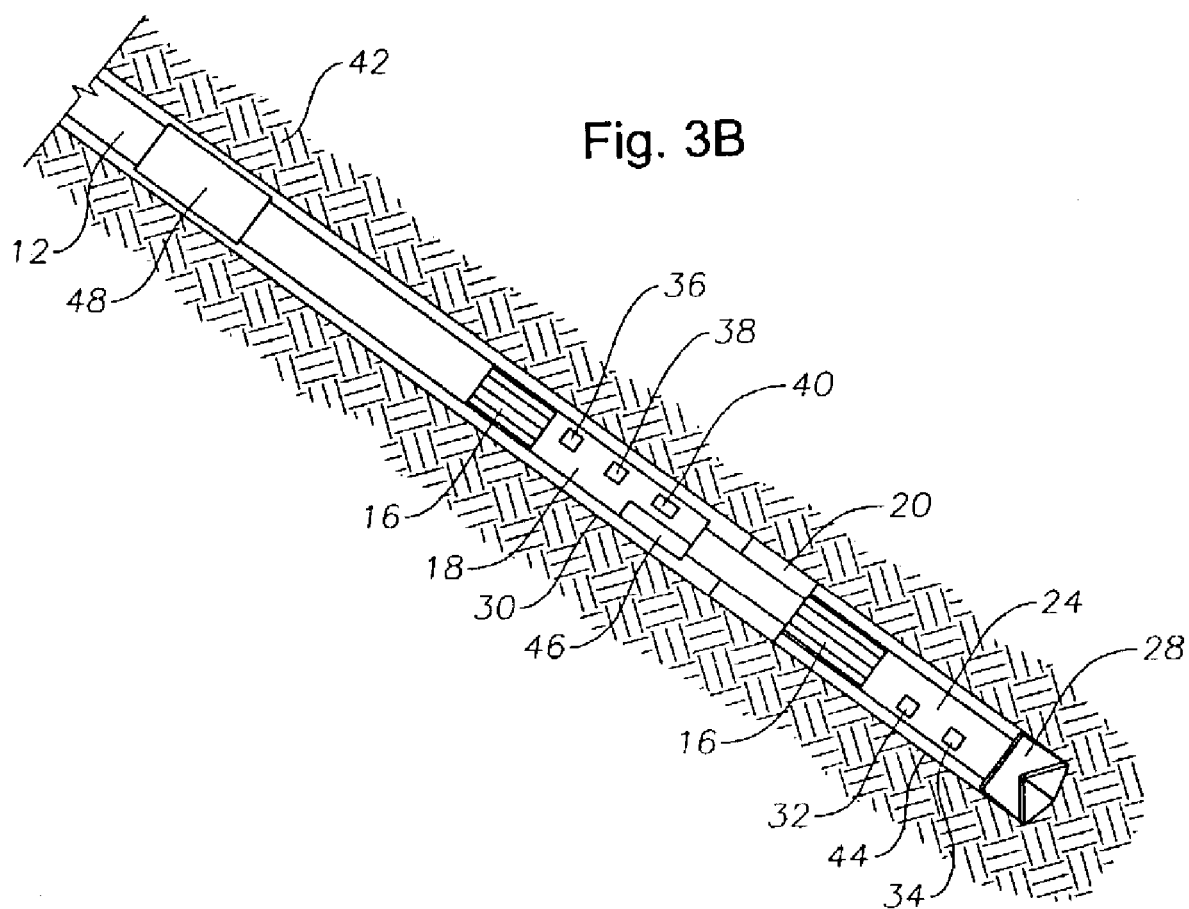
FIG. 3B is an enlarged view of a portion of the drill string of FIG. 2 showing the lower end of the bottom hole assembly with a sensor arrangement of the present invention in a second drilling location.

As can be seen in FIGS. 3A and 3B, the MWD module 18 follows nominally the same path as the electronics section 24 as the borehole is being drilled.

FIG. 3A is an enlarged view of a portion of the drill string of FIG. 2 showing the lower end of the bottom hole assembly 10 in a first drilling location. The electronics section 24 is adjacent to a location in the borehole 4 indicated by numeral 30.

In the electronics section 24 are one or more sensors 32, 34 which, because of the hostile conditions adjacent to the drill bit 28, may not maintain their calibration to the desired level. These sensors may measure certain desirable properties in the drilling environment such as inclination, azimuth, gamma ray, temperature, acceleration, gravity, magnetism, hole caliper, neutron density, resistivity, tortuosity, electromagnetic wave propagation, sonic velocity, rate of penetration, RPM, torque and weight on bit.

It is very desirable to measure these properties close to the drill bit 28 because the drilling fluid 8 often intrudes into the formation 6 and affects the measured properties. Measuring these properties near the drill bit provides the highest accuracy because the formation 6 adjacent to the drill bit 28 has spent only a short time exposed to the drilling fluid 8. Other factors, such as stresses and temperatures in the formation 6 are also affected by the drilling action independently of the drilling fluid.

Sensors 32, 34 generally need to be as small as possible to be located adjacent to or within the drill bit 28. For this reason, it may be desirable to eliminate the temperature compensation apparatus with certain of the sensors, such as accelerometers, to minimize their size. When temperature compensation is eliminated, however, the output of the accelerometer will be affected by temperature changes.

In order to utilize sensors 32, 34 to obtain high-accuracy readings, a second set of sensors 36, 38, 40 are located in the MWD module 18. When the BHA is in the first drilling location shown in FIG. 3A, the MWD module 18 is adjacent to a location in the borehole 4 indicated by numeral 42.

However, as drilling continues, the MWD module 18 follows nominally the same path as the electronics section 24, and eventually reaches the configuration shown in FIG. 3B.

FIG. 3B is an enlarged view of a portion of the drill string of FIG. 2 showing the bottom hole assembly of FIG. 3A in a second drilling location. In this position, the electronics section 24 is adjacent to a location in the borehole 4 indicated by numeral 44 and the MWD module 18 is adjacent to the location in the borehole 4 indicated by numeral 30, that was previously to the electronics section 24.

Sensors 36, 38, 40 in the MWD module 18 are of high accuracy. They are not subjected to the hostile conditions adjacent to the drill bit 28, and there is adequate space to accommodate those sensors, which may be larger in size, to attain high accuracy. These sensors 36, 38, 40 also measure certain desirable properties in the drilling environment such as inclination, azimuth, gamma ray, temperature, acceleration, gravity, magnetism, hole caliper, neutron density, resistivity, tortuosity, electromagnetic wave propagation, sonic velocity, rate of penetration, RPM, torque and weight on bit.

If the electronics section 24 is equipped with sensors 32, 34 that can make the same type of surveying measurements as sensors 36, 38, 40 in the MWD module 18 then two independent estimates of survey measurements such as inclination, azimuth, build, and turn can be obtained.

If, as described above, the electronics section's 24 sensor 32, 34 performance is inferior to those of the MWD module 18, then comparison of survey measurements can be made to reveal the numerical value of the error sources within the electronics section's 24 sensors 32, 34. The computations could be mechanized down-hole or at the surface, using on-line parameter estimation techniques. Once known, the error values can be used to update and improve the corrections applied to the electronics section's 24 sensor measurements or to the steering commands of the rotary steerable system 22. This will improve the surveying performance of the electronics section 24 and thus the drilling system's overall performance.

For example, the force feedback loops in accelerometer sensors for surveys require temperature compensation on their outputs for high accuracy. In general, small devices suitable for close packaging, low power etc. have lower accuracies and are more rugged. It may be desirable for space and expense reasons that one of the sensors 32, 34 within the electronics section 24 be an accelerometer of the non-temperature compensated type (e.g. an open loop spring restrained device as opposed to a force-feedback one). This type of sensor behaves in a known manner with respect to temperature variations. Therefore, the acceleration reading provided by this sensor in the electronics section 24 at location 30 in the borehole 4 can be re-calibrated for temperature compensation by a reading from a temperature sensor located in the MWD module 18 when it reaches location 30 in the borehole 4. Alternatively, the information may be used by another connected system that can make allowances for the offset.

In a similar manner, a reading from a non-survey grade magnetometer sensor (with an indicative offset of 1%) in the electronics section 24 at location 30 in the borehole 4 may be re-calibrated by a survey grade magnetometer (with an indicative offset of 0.05%) located in the MWD module 18 as it later reaches location 30 in the borehole 4.

In another instance, the reading error on magnetometers caused by the iron containing components in the drill bit and other portions of the BHA adjacent to the electronics section 24 may be offset by magnetometers located in the MWD module 18.

Since drilling is generally a continuous process, the sensor re-calibrations may be made continuously as drilling progresses. In order to process these re-calibration readings, a device 46 in the MWD module 18 receives the readings from the sensors 32, 34 within the electronics-section 24 and compares them with one or more of the sensors 36, 38, 40 in the MWD module 18. The readings may be transmitted from the electronics section 24 to the MWD module 18 by any one or more of the well known downhole communications methods including short hop RF communication, direct wiring, mud pulse telemetry, sonic pulses in the BHA, or other well known devices.

Alternatively, both the MWD module 18 and the electronics section 24 could transmit their readings to a surface device 50 near the drilling rig 14 or elsewhere, for display or processing. Alternately, the readings may be transmitted to a third tool module 48 located elsewhere in the drill string 12. The data made be stored in this third tool module 48 or in the MWD module 18 for later retrieval at the surface after the BHA is pulled from the borehole 4. Regardless of the exact manner in which the data is routed, the readings of sensors are processed and the information is used to provide re-calibration offsets to the readings from the sensors 36, 38 in the electronics section 24.

In the case where the sensors 32, 34 in the electronics section 24 are mounted on a roll stabilized platform, an additional level of measurement independence can be introduced by deliberately altering the roll angle relationship of the electronics section 24 to the MWD module 18. This allows improved surveying performance to be achieved by deliberately tumbling the sensors 32, 34 about the roll axis during a survey period. By a process of averaging the survey results, this will cause all errors parallel to the tool face to be averaged to near zero. This operation may be performed while drilling i.e. no need to stop drill string rotation. Furthermore, if the drill string rotation is stopped soon after a survey period it will be possible to directly calculate the magnetic offsets caused by rotating a conducting collar in the earth's magnetic field. This correction term will be of benefit to other BHA systems.

As stated above, in order to perform the re-calibration parameter estimations it is necessary to compare survey measurements from the same measured depth. The source of depth information may be supplied directly. Alternatively, by cross-correlating the stream of survey measurements a maximum correlation will be obtained when the measurements correspond to the same measured depth thereby obviating the need to obtain measured depth directly. Since the displacement between the electronics section 24 and MWD module 18 is fixed, this correlation will provide a down-hole estimate of rate of penetration.

Alternatively, these computations might be performed at the surface where depth will be more readily determined.

Whereas the present invention has been described in particular relation to the drawings attached hereto, it should be understood that other and further modifications apart from those shown or suggested herein, may be made within the scope and spirit of the present invention. For example, while only two sensors 34, 36 have been indicated in the electronics section 24 and three sensors 36, 38, 40 have been indicated in the MWD module 18, from one to any number of sensors may be located in either module, depending upon the need.

What is claimed is:

1. A method for sensing a condition in a borehole while drilling with a drill string, comprising the steps of:
    providing a first sensor in the drill string adjacent to a drill bit for measuring the borehole condition,
    providing a second sensor in the drill sting remote from the first sensor for measuring the borehole condition,
    measuring the borehole condition with the first sensor at a first location in the borehole, drilling until the second sensor reaches the first location in the borehole,
    measuring the borehole condition with the second sensor at the first location in the borehole, and,
    re-calibrating the first sensor using the measurement made by the second sensor at the first location within the borehole.

2. The method of claim 1 wherein the first sensor is selected from a group of sensors consisting of inclination, azimuth, gamma ray, temperature, acceleration, gravity. magnetism, hole caliper, neutron density, resistivity, tortuosity, electromagnetic wave propagation, sonic velocity, rate of penetration, RPM, torque and weight on bit.

3. The method of claim 2 wherein the second sensor is of the same type as the first sensor.

4. The method of claim 1 wherein the second sensor is located in a measuring while drilling module.

5. The method of claim 4 wherein the measurement from the first sensor is transmitted to the measuring while drilling module.

6. The method of claim 5 wherein the measurement from the first sensor is transmitted in a manner selected from the group consisting of short hop RF communication, direct wiring, mud pulse telemetry and sonic pulses.

7. The method of claim 1 comprising the step of transmitting the re-calibrated reading of the first sensor to a surface device.

8. The method of claim 1 comprising the step of transmitting the measurement from the first sensor and the measurement from the second sensor to a surface device, and re-calibrating the first sensor in the surface device.

9. The method of claim 8 comprising the step of displaying the re-calibrated measurement adjacent to a drilling rig.

10. The method of claim 4 wherein the measurement from the first sensor and the measurement from the second sensor are transmitted to a third tool module in the drill string.

11. The method of claim 10 wherein the measurements from the first and second sensors are transmitted in a manner selected from the group consisting of short hop RF communication, direct wiring, mud pulse telemetry, and sonic pulses.

12. A bottom hole assembly of a drill string for drilling a borehole, the bottom hole assembly comprising a first sensor in the drill string adjacent to a drill bit for measuring a condition of the borehole at a location in the borehole, a second sensor in the drill string, remote from the first sensor, for measuring the same borehole condition, a device to store the measurement made by the first sensor and compare it to the measurement made by the second sensor, said device providing a re-calibration offset for the first sensor based upon the comparison.

13. The bottom hole assembly of claim 12 wherein the first sensor is selected from a group of sensors consisting of inclination, azimuth, gamma ray, temperature, acceleration, gravity, magnetism, hole caliper, neutron density, resistivity, tortuosity, electromagnetic wave propagation, sonic velocity, rate of penetration, RPM, torque and weight on bit.

14. The bottom hole assembly of claim 13 wherein the second sensor is of the same type as the first sensor.

15. The bottom hole assembly of claim 12 wherein the second sensor is located in a measuring while drilling module.

16. The bottom hole assembly of claim 15 wherein the measurement from the first sensor is transmitted to the measuring while drilling module.

17. The bottom hole assembly of claim 16 wherein the measurement from the first sensor is transmitted in a manner selected from the group consisting of short hop RF communication, direct wiring, mud pulse telemetry, and sonic pulses.

18. The bottom hole assembly of claim 14 wherein the measurement from the first sensor and the measurement from the second sensor are transmitted to a third tool module in the drill string.

19. The bottom hole assembly of claim 18 wherein the measurements from the first and second sensors are transmitted in a manner selected from the group consisting of short hop RF communication, direct wiring, mud pulse telemetry, and sonic pulses.

20. A method for sensing a first condition in a borehole while drilling with a drill string, comprising the steps of:
   providing a sensor in the drill string adjacent to a drill bit for measuring the first borehole condition,
   providing a second sensor in the drill string remote from the first sensor for measuring a second borehole condition,
   measuring the first borehole condition with the first sensor at a first location in the borehole, drilling until the second sensor reaches the first location of the borehole,
   measuring the second borehole condition with the second sensor at the first location within the borehole, and,
   re-calibrating the first sensor using the measurement made by the second sensor at the first location within the borehole.

21. The method of claim 20 wherein the first sensor is selected from a group of sensors consisting of inclination, azimuth, gamma ray, temperature, acceleration, gravity, magnetism, hole caliper, neutron density, resistivity, tortuosity, electromagnetic wave propagation, sonic velocity, rate of penetration, RPM, torque and weight on bit.

22. The method of claim 21 wherein the second sensor is selected from a group of sensors consisting of inclination, azimuth, gamma ray, temperature, acceleration, gravity, magnetism, hole caliper, neutron density, resistivity, tortuosity, electromagnetic wave propagation, sonic velocity, rate of penetration, RPM, torque and weight on bit.

23. The method of claim 20 wherein the second sensor is located in a measuring while drilling module.

24. The method of claim 23 wherein the measurement from the first sensor is transmitted to the measuring while drilling module.

25. The method of claim 24 wherein the measurement from the first sensor is transmitted in a manner selected from the group consisting of short hop RF communication, direct wiring, mud pulse telemetry, and sonic pulses.

26. The method of claim 20 comprising the step of transmitting the re-calibrated reading of the first sensor to a surface device for display or processing.

27. The method of claim 20 comprising the step of transmitting the measurement from the first sensor and the measurement from the second sensor to a surface device, and re-calibrating the first sensor in the surface device.

28. The method of claim 27 comprising the step of displaying the re-calibrated measurement adjacent to a drilling rig.

29. The method of claim 23 wherein the measurement from the first sensor and the measurement from the second sensor are transmitted to a third tool module in the drill string.

30. The method of claim 29 wherein the measurements from the first and second sensors are transmitted in a manner selected from the group consisting of short hop RF communication, direct wiring, mud pulse telemetry, and sonic pulses.

31. A bottom hole assembly of a drill string for drilling a borehole, the bottom hole assembly comprising a first sensor in the drill string adjacent to a drill bit for measuring a first borehole condition at a location in the borehole, a second sensor in the drill string remote from the first sensor for measuring a second borehole condition, a device to store the measurement made by the first sensor and compare it to the measurement made by the second sensor, said device producing a re-calibration offset for the first sensor based upon the comparison.

32. The bottom hole assembly of claim 31 wherein the first sensor is selected from a group of sensors consisting of inclination, azimuth, gamma ray, temperature, acceleration, gravity, magnetism, hole caliper, neutron density, resistivity, tortuosity, electromagnetic wave propagation, sonic velocity, rate of penetration, RPM, torque and weight on bit.

33. The bottom hole assembly of claim 32 wherein the second sensor is selected from a group of sensors consisting of inclination, azimuth, gamma ray, temperature, acceleration, gravity, magnetism, hole caliper, neutron density, resistivity, tortuosity, electromagnetic wave propagation, sonic velocity, rate of penetration, RPM, torque and weight on bit.

34. The bottom hole assembly of claim 31 wherein the second sensor is located in a measuring while drilling module.

35. The bottom hole assembly of claim 34 wherein the measurement from the first sensor is transmitted to the measuring while drilling module.

36. The bottom hole assembly of claim 35 wherein the measurement from the first sensor is transmitted in a manner selected from the group consisting of short hop RF communication, direct wiring, mud pulse telemetry, and sonic pulses.

37. The bottom hole assembly of claim 35 wherein the measurement from the first sensor and the measurement from the second sensor are transmitted to a third tool module in the drill string.

38. The bottom hole assembly of claim 37 wherein the measurements from the first and second sensors are transmitted in a manner selected from the group consisting of short hop RF communication, direct wiring, mud pulse telemetry, and sonic pulses.

* * * * *